(12) United States Patent
Abdallah et al.

(10) Patent No.: US 6,999,976 B2
(45) Date of Patent: Feb. 14, 2006

(54) METHOD, APPARATUS, AND PROGRAM FOR USING A JAVA ARCHIVE TO ENCODE A FILE SYSTEM DELTA

(75) Inventors: Nabeel W. Abdallah, Raleigh, NC (US); Thomas F. Bitonti, Cary, NC (US); Hans P. Jerkewitz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 10/157,535

(22) Filed: May 29, 2002

(65) Prior Publication Data

US 2003/0225795 A1    Dec. 4, 2003

(51) Int. Cl.
*G06F 12/00*   (2006.01)
*G06F 17/30*   (2006.01)
*G06F 9/44*    (2006.01)
*G06F 3/00*    (2006.01)
*G06F 15/177*  (2006.01)
*G06F 15/16*   (2006.01)

(52) U.S. Cl. ............ 707/200; 707/204; 717/169; 715/764; 709/220; 709/202

(58) Field of Classification Search ........ 707/200, 707/204; 717/169; 715/764; 709/220, 202
See application file for complete search history.

(56) References Cited

U.S. PATENT DOCUMENTS 5,919,247 A    7/1999  Van Hoff et al.
6,029,196 A    2/2000  Lenz
6,052,531 A    4/2000  Waldin, Jr. et al.
6,148,340 A    11/2000 Bittinger et al.
6,161,218 A    12/2000 Taylor
6,167,407 A    12/2000 Nachenberg et al.
6,278,452 B1 * 8/2001  Huberman et al. ......... 345/764

(Continued)

FOREIGN PATENT DOCUMENTS

GB    2341462 A    3/2000

OTHER PUBLICATIONS

IBM Research Disclosure 431155, "File Format for Packaging of System Software Updates", Mar. 2000, pp. 568-569.

(Continued)

*Primary Examiner*—Mohammad Ali
*Assistant Examiner*—Kuen S. Lu
(74) *Attorney, Agent, or Firm*—Yee & Associates PC

(57) ABSTRACT

A mechanism is provided for extending a Java archive file to include additional information that describes the contents of the archive as update information. A program is provided for determining differences between an initial file system tree and a final file system tree and encoding those differences into entries in a Java archive file. An extractor class is included in the Java archive file and named as the main class. The Java archive file may be transported to a site that needs a file system update. The Java archive file may be executed in a Java runtime environment to update a target file system. The extractor class is executed to decode and effectuate the difference entries in the archive file.

15 Claims, 7 Drawing Sheets

U.S. PATENT DOCUMENTS

| | | |
|---|---|---|
| 6,282,709 B1 | 8/2001 | Reha et al. |
| 6,286,051 B1 | 9/2001 | Becker et al. |
| 6,535,894 B1 * | 3/2003 | Schmidt et al. ............. 707/204 |
| 6,633,892 B1 * | 10/2003 | Chan et al. ................. 707/204 |
| 6,732,108 B2 * | 5/2004 | Factor et al. ............... 707/100 |
| 2001/0042073 A1 | 11/2001 | Saether et al. |
| 2003/0071860 A1 * | 4/2003 | Goddard et al. ............ 345/866 |
| 2003/0172135 A1 * | 9/2003 | Bobick et al. .............. 709/220 |
| 2003/0177485 A1 * | 9/2003 | Waldin et al. .............. 717/169 |
| 2004/0133629 A1 * | 7/2004 | Reynolds et al. ........... 709/202 |

OTHER PUBLICATIONS

Schreiber SB., "Inside Windows Cabinet Files", Dr. Dobb's Journal, vol. 22, No. 5, pp. 20, 22, 24, 26, 73, May 1997, abstract.

* cited by examiner

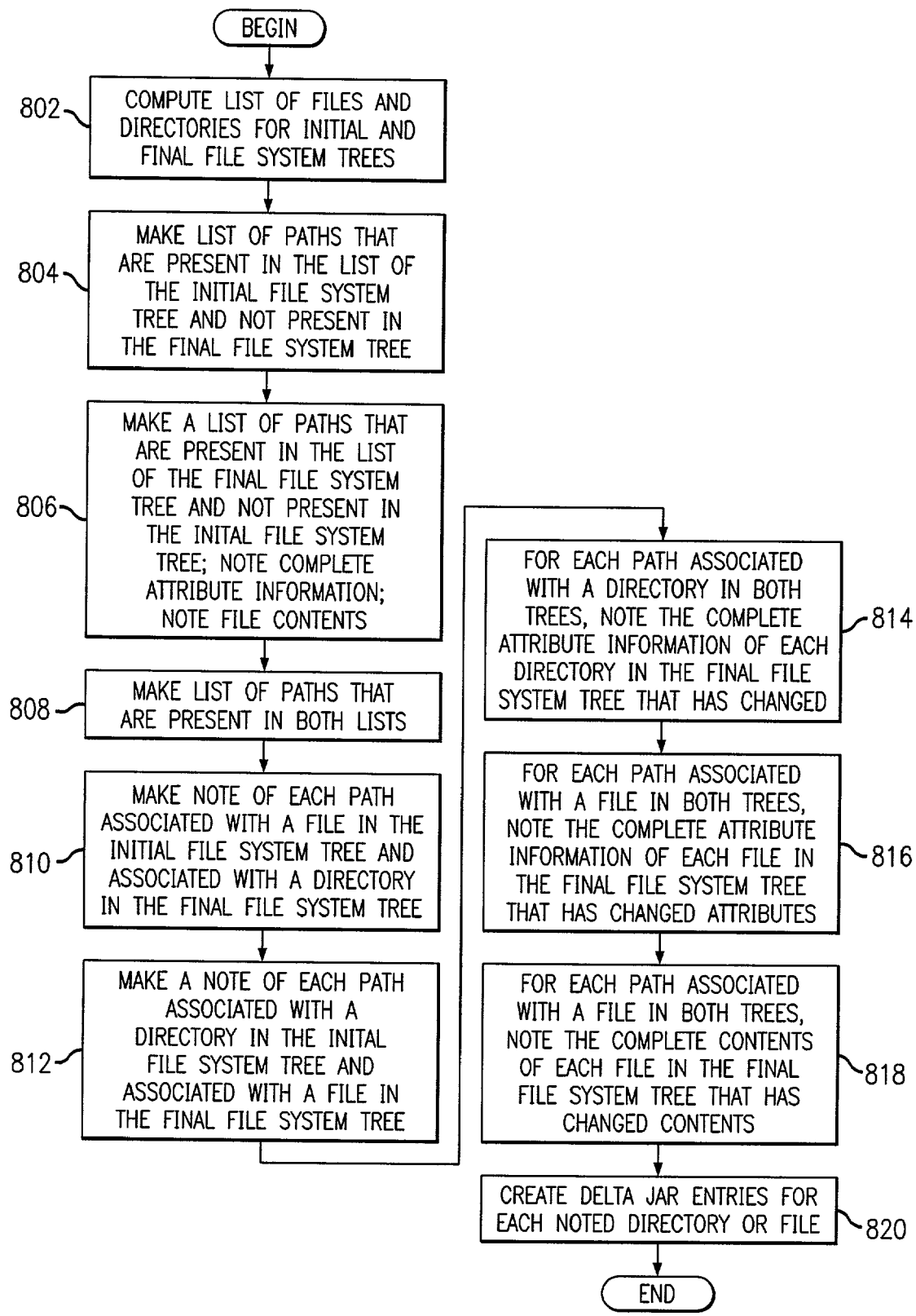

METHOD, APPARATUS, AND PROGRAM FOR USING A JAVA ARCHIVE TO ENCODE A FILE SYSTEM DELTA

BACKGROUND OF THE INVENTION

1. Technical Field

The present invention relates to data processing systems and, in particular, to performing file system updates. Still more particularly, the present invention provides a method, apparatus, and program for using a Java archive to encode file system update information.

2. Description of Related Art

The problem of providing updates to the installation image of a customer application is a well studied problem. Often, a customer application is created which encodes all required update information. A deficiency of this solution is a lack of generality, both in terms of handling different customer applications, and in terms of a reliance on a non-industry standard packaging mechanism.

A related solution is to pack new or updated files into an archive, either as a Java archive (JAR), ZIP archive, or a Tape archive (TAR) file. This related solution avoids the above deficiencies; however, this solution fails to provide complete update information. The standard ZIP, JAR, and TAR formats do not provide information that describes contained files as new, updated, or obsolete. Another disadvantage of these solutions is a lack of platform independence.

Therefore, it would be advantageous to provide an improved mechanism for encoding file system update information.

SUMMARY OF THE INVENTION

The present invention provides a mechanism for extending a Java archive file to include additional information that describes the contents of the archive as update information. A program is provided for determining differences between an initial file system tree and a final file system tree and encoding those differences into entries in a Java archive file. An extractor class is included in the Java archive file and named as the main class.

The Java archive file may be transported to a site that needs a file system update. The Java archive file may be executed in a Java runtime environment to update a target file system. The extractor class is executed to decode and effectuate the difference entries in the archive file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart illustrating the process by which the Delta class encodes difference information in accordance with a preferred embodiment of the present invention.

DETAILED DESCRIPTION OF THE PREFERRED EMBODIMENT

Figure 1:
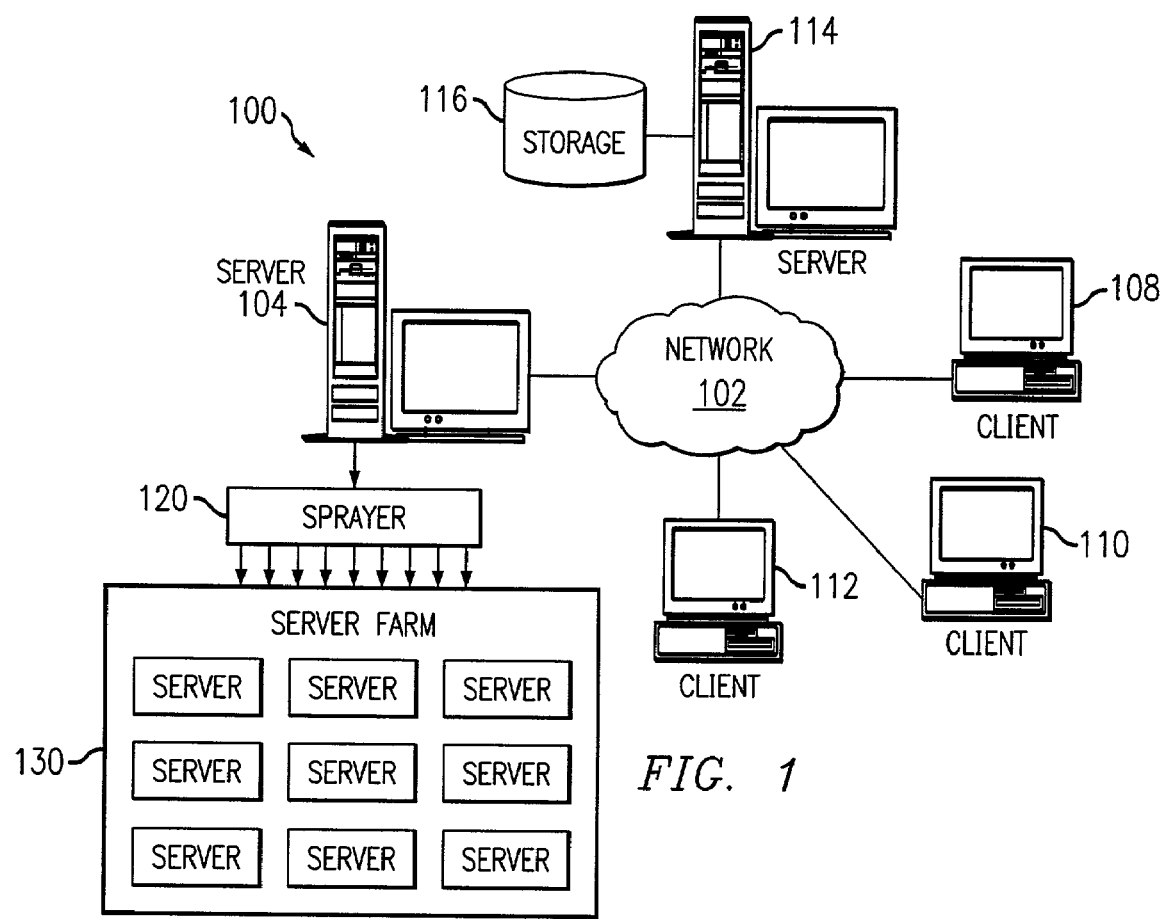
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102. In addition, clients 108, 110, 112 are connected to network 102. These clients 108, 110, and 112 may be, for example, personal computers or network computers. In the depicted example, server 104 provides data, such as boot files, operating system images, and applications to clients 108–112. In a specific example, server 104 may be a Web server. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

To provide service on a scalable range, server farm 130 may be used. Server 104 may direct requests from clients to one of the servers in server farm 130 through sprayer 120. The sprayer distributes requests to one of the servers in the server farm and may perform other functions, such as load balancing. Each server in the server farm may run all the available applications.

Applications and content for the server farm 130 may be developed at clients 108, 110, 112 or at server 114. Updates to the applications or content may be stored at server 114 in storage 116 for subsequent retrieval by customers. Thus, a customer may download the update from server 114 using, for example, Hypertext Transfer Protocol (HTTP) or File Transfer Protocol (FTP) and apply the update to the servers in server farm 130. Other methods of transporting updates to customers may also be employed. For example, the updates may be sent to the customer via e-mail or on a physical medium, such as a compact disk read-only memory (CD-ROM).

Furthermore, the customer may store applications and content in an environment other than a server farm. A customer may store a particular file system in association with a single server or on a personal computer. For example, the applications and/or content may be embodied in a Web server environment on a plurality of servers in a server farm or, alternatively, in a distributed computing environment on a plurality of personal computers connected through a network. Still further, the applications and/or content may be embodied on a single stand-alone computer.

Figure 2:
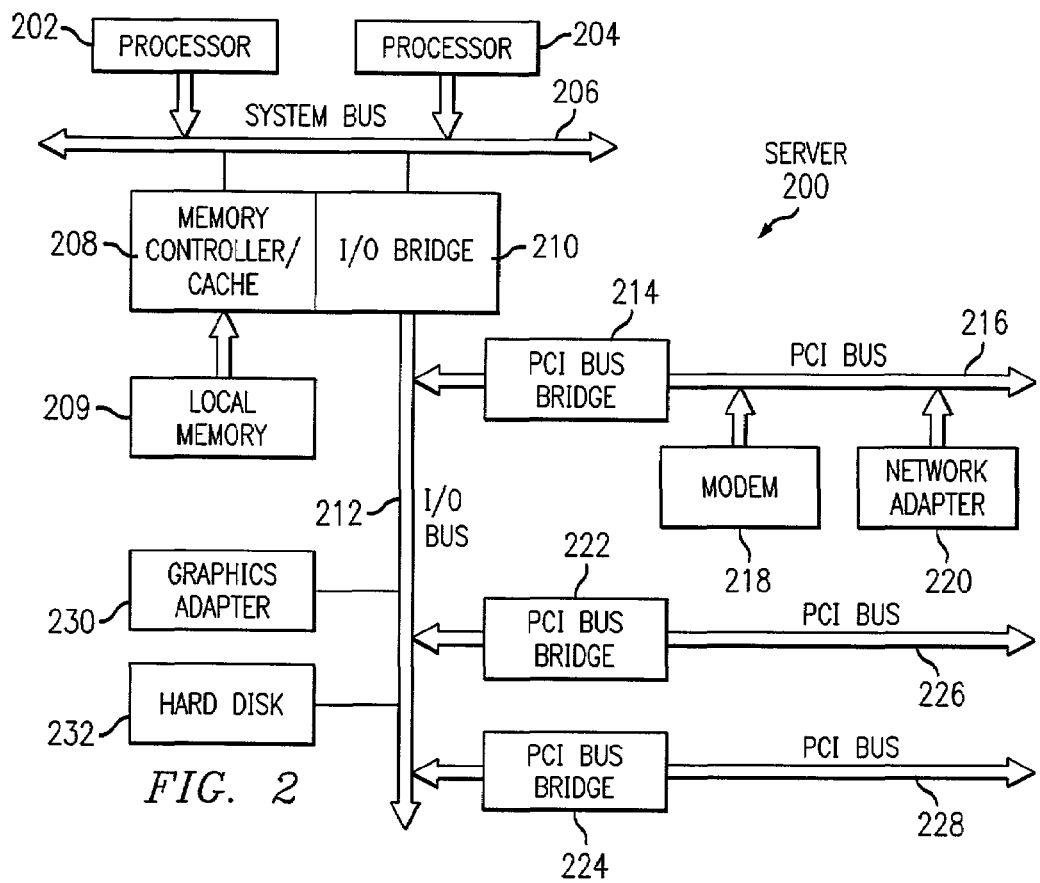
FIG. 2 is a block diagram of a data processing system that may be implemented as a server in accordance with a preferred embodiment of the present invention.

Referring to FIG. 2, a block diagram of a data processing system that may be implemented as a server, such as servers 104, 114 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
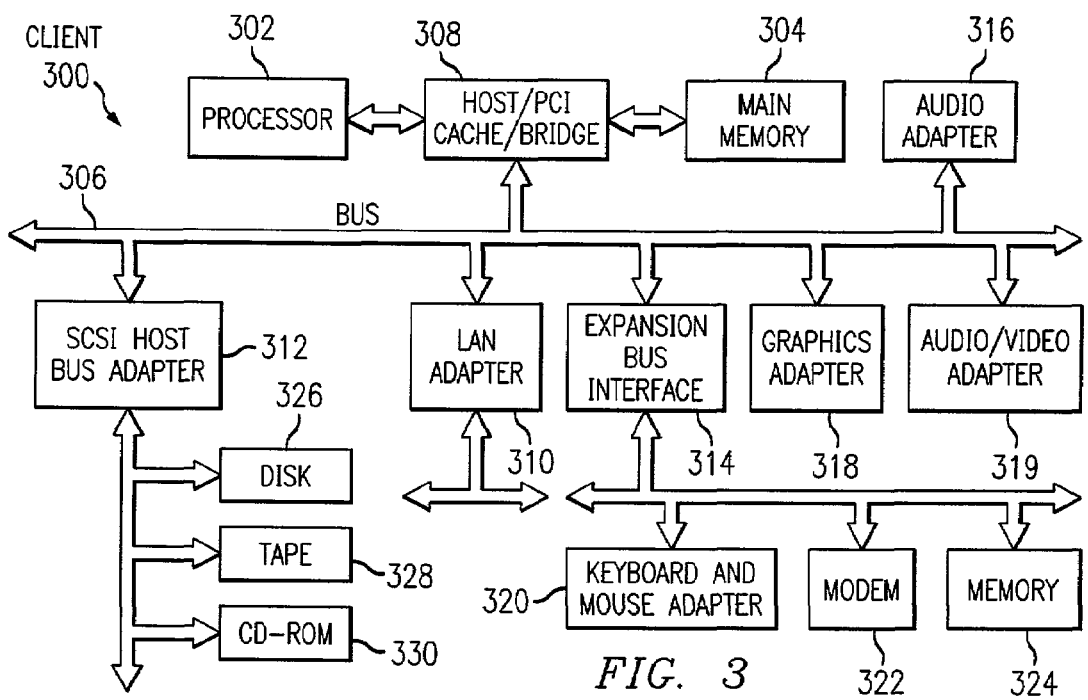
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

File systems containing Java applications and/or content are typically distributed using a Java archive (JAR) file. A JAR file contains all the resources required to install and run a Java program in a single file, which is compressed in the ZIP format. Java archive files may also be used to distribute JavaBeans. The typical operation of a Java archive is to hold a collection of files. Additionally, properties may be associated with the archive through a manifest, including archive wide properties and including properties that are associated with particular files.

This view is typical, but is not exclusive. In more generality, a Java archive contains a collection of binary objects, each being a collection of bytes, and being called a JAR entry. A Java archive contains a manifest, which includes a main manifest and information pertaining to the entries which make up the archive proper. In this mode Java archives may be used to hold collections of Java files for use by a Java runtime environment. One mode of operation for the execution of Java programs is to specify a main class and to specify a collection of Java archives which contain Java object code of the main class as well as for other required classes.

In accordance with a preferred embodiment of the present invention, a second mode of operation uses the manifest of a Java archive to hold the main class specification. In this second mode a Java archive containing the main class specification is provided to the Java runtime environment. The Java runtime environment retrieves the main class specification and proceeds as described previously.

The present invention applies to the specialization of Java archives to hold difference information suitable for use to update a file system tree. As described herein, the specialized Java archives hold not only the file system difference information, but also a Java extractor class and manifest information which specifies that the extractor class is the main class to be executed.

The complete mechanism requires two object modules, one being the extractor object module, which is used to comprehend and apply the difference information contained in a specialized Java archive, and a second being a delta object module, which is used to compare two file system trees and encode the resulting difference information into a specialized Java archive. The delta object module has the responsibility to compute complete difference information, to encode this information into a specialized Java archive, and to place the extractor object module, as well as a main class specification, into the specialized Java archive.

Figure 4:
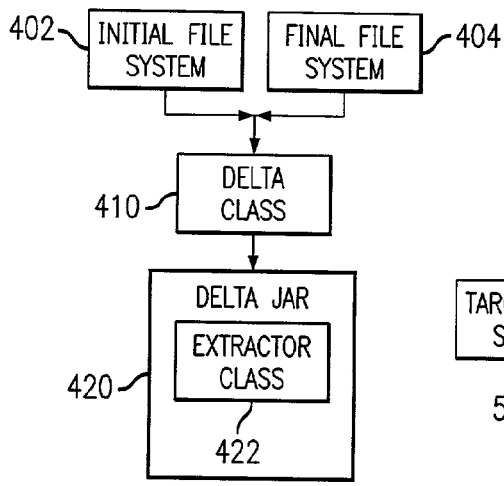
FIG. 4 is a block diagram illustrating the creation of a difference Java archive in accordance with a preferred embodiment of the present invention.

With reference to FIG. 4, a block diagram illustrating the creation of a difference Java archive is shown in accordance with a preferred embodiment of the present invention. An initial file system 402 and a final file system 404 represent an application or content before and after an update, respectively. Delta class 410 receives the initial file system and the final file system as input. The delta class is a Java object module (class file) that is executed against two input file system trees and using a supplied directives file, and which is provided a number of classes used during extraction, including extractor class 422. The Delta class computes difference information and stores that information, along with a main class specification and extractor class 422, into delta JAR file 420.

The delta Jar file is a specialized Java archive file containing difference information. The delta JAR includes an extractor class, which is a Java object module (class file) that is executed to comprehend and apply the contents of a Delta JAR to a target file system tree.

The two file system trees are identified as an "initial" file system tree and a "final" file system tree. The labels "initial" and "final" are used to describe the use to which the labeled file system trees are put. In other words, the Delta class encodes information which is sufficient for updating the "initial" file system tree to be equivalent to the "final" file system tree.

As an example, the "initial" file system tree may be a snapshot of a file system tree made at a point in time and the "final" file system tree may be a snapshot of the file system tree at an earlier point in time. In this case the computed difference information, used as described by this application, provides a means to restore the file system tree to its earlier state. For reference this case is called the "file system checkpoint" case.

Alternatively, the "initial" file system tree may be a snapshot of an application installation. In this case the "final" file system tree may be a snapshot of the application installation where fixes and other modification have been made. The computed difference information provides a means of updating a third file system tree, typically, an actual customer installation, so to update that installation to include fixes, updates, and other modifications. For reference this case is called the "application update" case.

Figure 5:
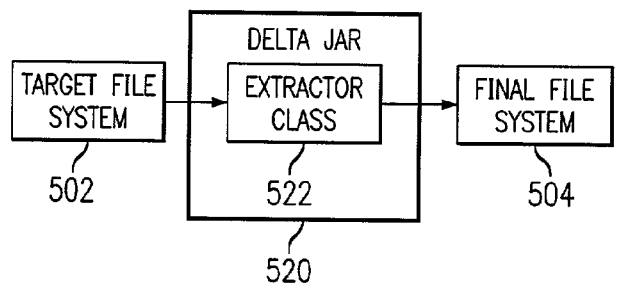
FIG. 5 is a block diagram illustrating the modification of a file system using a difference Java archive in accordance with a preferred embodiment of the present invention.

With reference now to FIG. 5, a block diagram illustrating the modification of a file system using a difference Java archive is shown in accordance with a preferred embodiment of the present invention. Delta JAR 520 receives target file system 502 as input and extractor class 522 is executed in a Java runtime environment to examine the difference information and perform operations in accordance with that difference information to update the target file system tree. The operations of the extractor class result in final file system 504.

Figure 6:
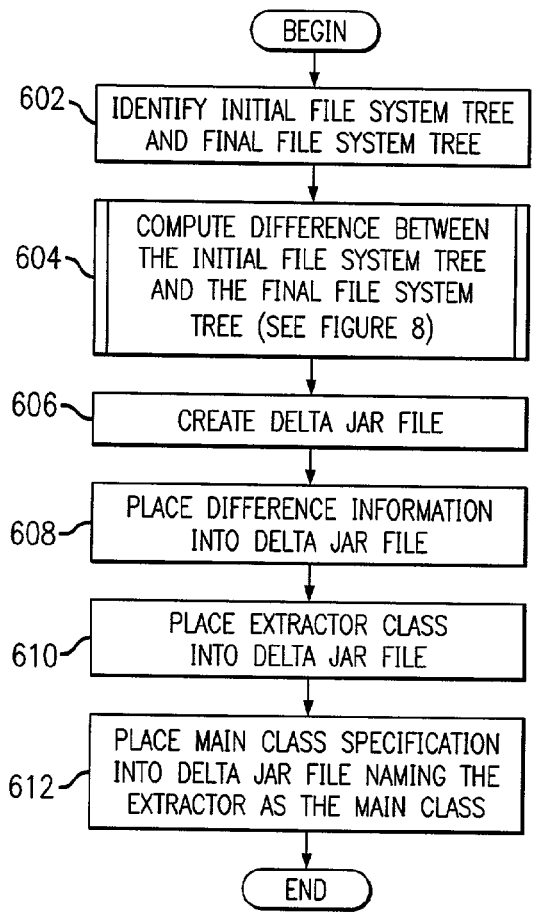
FIG. 6 is a flowchart illustrating the operation of the delta class in accordance with a preferred embodiment of the present invention.

FIG. 6 is a flowchart illustrating the operation of the delta class in accordance with a preferred embodiment of the present invention. The process begins and identifies the initial file system tree and the final file system tree (step 602). The delta class computes the difference between the initial file system tree and the final file system tree (step 604). The detailed process of the computation of the difference information according to a preferred embodiment of the present invention will be described in more detail below with respect to FIG. 8.

The Delta class creates a delta JAR file (step 606) and places the difference information into a Delta JAR file (step 608). Next, the Delta class places the Extractor class into the Delta JAR file (step 610), and places a main class specification into the Delta Jar file naming the Extractor as the main class (step 612). Thereafter, the resulting Delta JAR file is transported, either in time in the "file system checkpoint" case, or in space in the "Application Update" case (step 614) and the process ends.

Note that the part of this process in which the delta class computes difference information and stores that information in a delta JAR file may be modified. As a delta JAR file holding difference information as well as the extractor classes and main class specification are all that are required to apply the delta JAR file to a target file system, there is no need to actually perform a comparison to place difference information into the delta JAR file. Instead, difference information may be placed directly into a delta JAR file through explicit directives, provided either directly when executing the delta object module, or provided indirectly through a directives file. These directives may be provided together with delta information computed from two file system trees, or may be provided by themselves, that is without having compared two file system trees.

Figure 7:
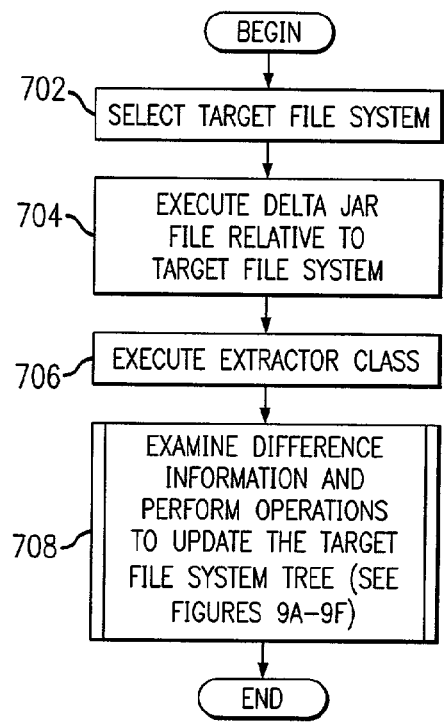
FIG. 7 is a flowchart illustrating the operation of the extraction and application of the difference information in a difference Java archive with respect to a target file system in accordance with a preferred embodiment of the present invention.

Turning to FIG. 7, a flowchart is shown illustrating the operation of the extraction and application of the difference information in a difference Java archive with respect to a target file system in accordance with a preferred embodiment of the present invention. A target file system is selected (step 702). A Java runtime environment is used to execute the delta JAR file relative to the specified target file system (step 704). The Java runtime environment, using the main class specification of the delta JAR file, executes the Extractor class (step 706).

The Extractor class is configured to accept the specified target file system and access the difference information held by the delta JAR file. The Extractor class examines the difference information and performs operations in accordance with that difference information to update the target file system tree (step 708). Thereafter, the process ends. The process of updating the target file system tree is described in more detail below with respect to FIGS. 9A–9F.

Difference Information:

A delta JAR file holds detailed information which describes the difference between two file system trees, that is, between initial and final file system trees. The detailed information is sufficient to update the initial file system tree to be equivalent to the final file system tree. The term "equivalent" is used herein to mean the following:

The same directories, in name and number, are present in both trees;

The nesting structure of the two trees is the same;

The same files, in name and number, are present in both trees;

The contents of files having the same names and in the same location in both trees are the same;

The attributes of directories having the same names and in the same location in both trees are the same; and The attributes of files having the same names and in the same location in both trees are the same.

The term "attributes"' has specialized meanings depending on specific file systems:

A Win32 file system file has the attributes:

| Read Only | [true\|false] |
|---|---|
| Archive | [true\|false] |
| System | [true\|false] |
| Hidden | [true\|false] |
| Create Stamp | [date/time] |
| Update Stamp | [date/time] |

A UNIX file system file has the attributes:

| System Read Access | [true\|false] |
|---|---|
| System Write Access | [true\|false] |
| System Execute Access | [true\|false] |
| Group Read Access | [true\|false] |
| Group Write Access | [true\|false] |
| Group Execute Access | [true\|false] |
| User Read Access | [true\|false] |
| User Write Access | [true\|false] |
| User Execute Access | [true\|false] |
| Update Stamp | [seconds] |

The mechanism as described herein provides the ability to update these specific file and directory attributes. However, as needed, the mechanism may be extended to update attributes for other types of file systems.

Delta Generation Process:

With reference now to FIG. 8, a flowchart illustrating the process by which the Delta class encodes difference information is shown in accordance with a preferred embodiment of the present invention. A root directory is specified. A directory that is a descendent of the specified root directory has a path relative to that directory. A file that is a descendent of the specified root directory has a path relative to that directory. The initial and final file system trees are assumed to be static at the time at which difference information is computed.

For each of the initial and final file system trees a complete list of files and directories is computed (step 802). The list contains the path of each file and directory relative to the specified root directory. The path is annotated with information which indicates if the path is to a file or is to a directory. The list of files and directories of the initial file system tree is computed with the list of files and directories of the final file system tree.

A list is made of the paths which are present in the list of the initial file system tree and which are not present in the list of the final file system tree (step 804). These are the paths of files and directories which have been removed. A list is made of the paths which are present in the list of the final file system tree and which are not present in the list of the initial file system tree (step 806). These are the paths files and directories which have been added. For each of these the complete attribute information of the directory in the final file system tree is noted. For each of these which is associated with a file the contents of that file in the final file system tree are noted.

A list is made of the paths which are present in both lists (step 808). These are the paths of files and directories which have neither been added nor removed, but which may have changed. The list of paths which are present in both lists is scanned further. A note is made of paths each of which is associated with a file in the initial file system true and which is associated with a directory in the final file system tree (step 810). A note is made of paths each of which is associated with a directory in the final file system tree and which is associated with a file in the final file system tree (step 812).

The paths which are associated with directories in both file system trees are examined. For each path, the attributes of the directory in the initial file system tree are compared with the attributes of the directory in the final file system tree. When any of the attributes are different, the complete attribute information of the directory in the final file system tree is noted (step 814).

The paths which are associated with files in both file system trees are examined. For each path, the attributes of the file in the initial file system tree are compared with the attributes of the file in the final file system tree. When any of the attributes are different, the complete attribute information of the file in the final file system tree is noted (step 816).

The paths which are associated with files in both file system trees are examined. For each path, the contents of the file in the initial file system tree are compared with the contents of the file in the final file system tree. When a difference is noted the contents of the file in the final file system tree are noted (step 818).

Noted information is stored into the specialized Java archive (step 820) and the process ends. For each directory that is noted as being present in the initial file system tree but not present in the final file system tree, a JAR entry is created, that JAR entry having the relative path of the directory and having a single byte. A manifest entry is created which is associated with the JAR entry and which flags the associated JAR entry as being a directory. An additional manifest entry is created and is associated with the JAR entry, the additional manifest entry flagging that the directory was removed. This type of JAR entry and manifest information are together called a "directory remove" entry.

For each directory that is noted as being present in the final file system tree but not present in the initial file system tree, a JAR entry is created, that JAR entry having the relative path of the directory and having a single byte. A manifest entry is created which is associated with the JAR entry and which flags the associated JAR entry as being a directory. Additional manifest entries are created which are associated with the JAR entry and which supply the attributes which were noted for the directory in the final file system tree, and which flag that the directory was added. This type of JAR entry and manifest information are together called a "directory create" entry.

For each directory that is noted as being present in the final file system tree for which a file exists in the initial file system tree and has the same path as the file, a JAR entry is created, that JAR entry having the relative path of the directory and having a single byte. Manifest entries are created which are associated with the JAR entry and which flag the JAR entry as being both a directory and a file. Additional manifest entries are created which are associated with the JAR entry and which supply the attributes which were noted for the directory in the final file system tree, and which flag that the directory was added and that the file was removed. This type of JAR entry and manifest information together are called a "file remove/directory create" entry.

For each directory that is noted in both the initial and final file system trees for which attribute differences were noted, a JAR entry is created, that JAR entry having the relative path of the directory and having a single byte. A manifest entry is created which is associated with the JAR entry and which flags the associated JAR entry as being a directory. Additional manifest entries are created which are associated with the JAR entry and which supply the attributes which were noted for the directory in the final file system tree, and which flag that the attributes of the directory were changed. This type of JAR entry and manifest information together are called a "directory attribute update" entry.

For each file which is noted as being present in the initial file system tree but not present in the final file system tree, a JAR entry is created, that JAR entry having the relative path the file and having a single byte. A manifest entry is created which is associated with the JAR entry and which flags the associated JAR entry as being a file. An additional manifest entry is created and is associated with the JAR entry, the additional manifest entry flagging that the file was removed. This type of JAR entry and manifest information together are called a "file remove" entry.

For each file that is noted as being present in the final file system tree but not present in the initial file system tree, a JAR entry is created, that JAR entry having the relative path of the file and holding the contents of the file in the final file system tree. A manifest entry is created which is associated with the JAR entry and which flags the associated JAR entry as being a file. Additional manifest entries are created which are associated with the JAR entry and which supply the attributes which were noted for the file in the final file system tree, and which indicate that the file was added. This type of JAR entry and manifest information together are called a "file create" entry.

For each file that is noted as being present in the final file system tree for which a directory exists in the initial file system tree which has the same path, a JAR entry is created, that JAR entry having the relative path of the file and holding the contents of the file in the final file system tree. Manifest entries are created which are associated with the JAR entry and which flag the associated JAR entry as being both a file and a directory. Additional manifest entries are created which are associated with the JAR entry and which supply the attributes which were noted for the file in the final file system tree, and which indicate that the file was added. This type of JAR entry and manifest information together are called a "file create/directory remove" entry.

For each file that is noted in both the initial and final file system trees for which attribute differences were noted, but which have the same contents, a JAR entry is created, that JAR entry having the relative path of the file and having a single byte. A manifest entry is created which is associated with the JAR entry and which flags the associated JAR entry as being a file. Additional manifest entries are created which are associated with the JAR entry and which supply the attributes which were noted for the file in the final file system tree, and which indicate that the file's attributes were changed. This type of JAR entry and manifest information together are called a "file attribute update" entry.

For each file that is noted in both the initial and final file system trees for which no attribute differences were noted, but which have differing contents, a JAR entry is created, that JAR entry having the relative path of the file and holding the contents of the file in the final file system tree. A manifest entry is created which is associated with the JAR entry and which flags the associated JAR entry as being a file. An addition attribute is associated with the JAR entry which flags that the file's contents were updated. This type of JAR entry and manifest information together are called a "file content update" entry.

For each file that is noted in both the initial and final file system trees for which attribute differences were noted, and which have differing contents, a JAR entry is created, that JAR entry having the relative path of the file and holding the contents of the file in the final file system tree. A manifest entry is created which is associated with the JAR entry and which flags the associated JAR entry as being a file. Additional manifest entries are created which are associated with the JAR entry and which supply the attributes which were noted for the file in the final file system tree, and which indicate that the file's attributes were changed and that the file's contents were updated. This type of JAR entry and manifest information together are called a "file content and attribute update" entry.

Summary of Entries:
In summary, the following are example types of entries that may be placed in a Delta JAR file:
  directory remove,
  directory create,
  directory attribute update,
  file remove,
  file create,
  file attribute update,
  file content update,
  file content/file attribute update,
  file create/directory remove, and
  file remove/directory create.

Entry Details:
The JAR entry and manifest entry information for each of these types of entries is as follows:

Directory Remove
  Jar Entry Name: relative path
  Jar Entry Contents: 1 byte
  Jar Entry TimeStamp: <unused>

Manifest Entries: flag directory, flag remove directory;

Directory Create
  Jar Entry Name: relative path
  Jar Entry Contents: 1 byte
  Jar Entry TimeStamp: attribute seconds | attribute file update
  Manifest Entries: flag directory, flag create directory, final attributes;

Directory Attribute Update
  Jar Entry Name: relative path
  Jar Entry Contents: 1 byte
  Jar Entry TimeStamp: attribute seconds | attribute file update
  Manifest Entries: flag directory, flag attribute update, final attributes;

File Remove
  Jar Entry Name: relative path
  Jar Entry Contents: 1 byte
  Jar Entry TimeStamp: <unused>
  Manifest Entries: flag file, flag remove file;

File Create
  Jar Entry Name: relative path
  Jar Entry Contents: final contents
  Jar Entry TimeStamp: attribute seconds | attribute file update
  Manifest Entries: flag file, flag create file, final attributes;

File Attribute Update
  Jar Entry Name: relative path
  Jar Entry Contents 1 byte
  Jar Entry TimeStamp: attribute seconds | attribute file update
  Manifest Entries: flag file, flag attribute update, final attributes;

File Content Update
  Jar Entry Name: relative path
  Jar Entry Contents: final contents
  Jar Entry TimeStamp: attribute seconds | attribute file update
  Manifest Entries: flag file, flag content update;

File Content/File Attribute Update
  Jar Entry Name: relative path
  Jar Entry Contents: final contents
  Jar Entry TimeStamp: attribute seconds | attribute file update
  Manifest Entries: flag file, flag content update, flag attribute update, final attributes;

File Create/Directory Remove
  Jar Entry Name: relative path
  Jar Entry Contents: final contents
  Jar Entry TimeStamp: attribute seconds | attribute file update
  Manifest Entries: flag file, flag directory, flag create file, flag remove directory, final attributes;

File Remove/Directory Create
  Jar Entry Name: relative path
  Jar Entry Contents: 1 byte
  Jar Entry TimeStamp: attribute seconds | attribute file update
  Manifest Entries: flag file, flag directory, flag remove file, flag remove directory, final attributes;

Extraction Process:

The entries as described above are used to update a specified target file system as follows:

1) Remove Files: "file remove" and "file remove/directory create" entries are processed;
2) Remove Directories: "directory remove" and "directory remove/file create" entries are processed;
3) Create Directories: "directory create" and "file remove/directory create" entries are processed;
4) Update Directory Attributes: "directory attribute update" entries are processed;
5) Place File Contents: "file create," "directory remove/file create," "file content update," and "file content/attribute update" entries are processed;
6) Update File Attributes: "file attribute update" and "file content/attribute update" entries are processed.

With reference to FIGS. 9A–9F, flowcharts are shown illustrating the operation of an extractor to process entries in a difference Java archive in accordance with a preferred embodiment of the present invention. Each entry has a name which is accepted as a path relative to the root of the target file system. The entries of type "file create/directory remove," "file remove/directory create," and "file content/ attribute update" are processed twice. The steps described below are adaptive, handling cases in which the target file system tree does not have the exact structure expected by the update processing. In certain cases particular entries may be modified to be processed as a different type of entry.

1) Remove Files

Figure 9A:
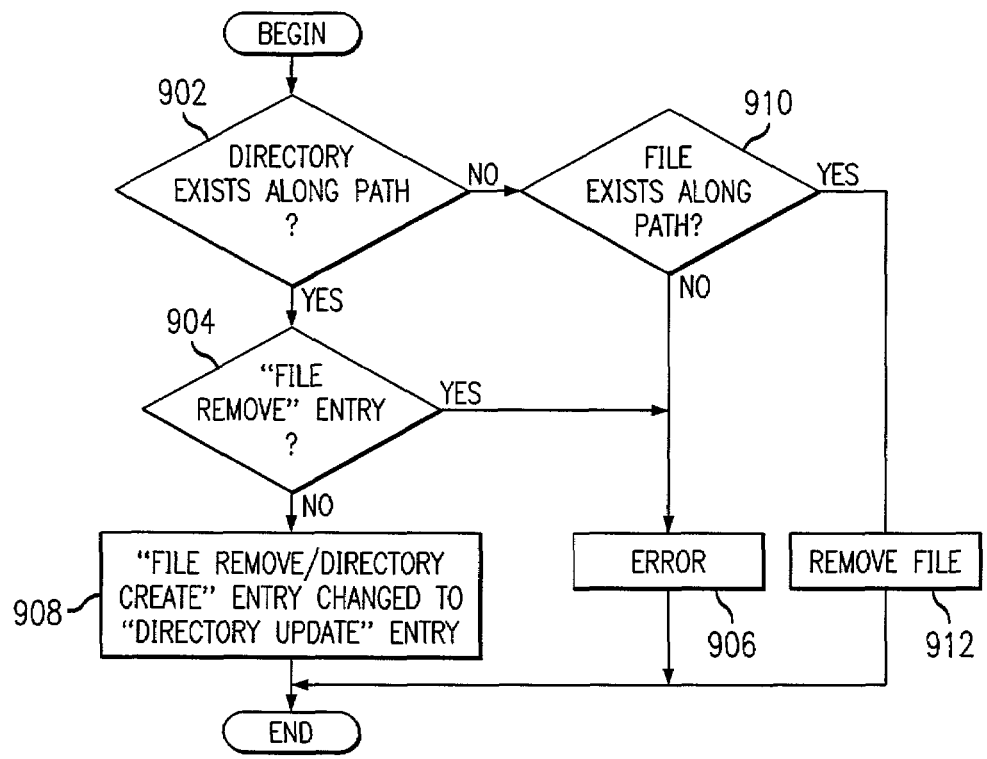
FIGS. 9A–9F are flowcharts illustrating the operation of an extractor to process entries in a difference Java archive in accordance with a preferred embodiment of the present invention.

Files are ordered according to their depth relative to the root of the target file system tree. For this step, files are processed in order from the greatest to the lowest depth. FIG. 9A illustrates the operation of an extractor processing "file remove" and "file remove/directory create" entries. The process begins and determines whether a directory exists along the specified relative path (step 902). If a directory exists along the specified path, a determination is made as to whether the entry is a "file remove" entry (step 904). If the entry is a "file remove" entry, then an error has occurred (step 906) and processing ends.

If a directory exists along the specified relative path and the entry is not a "file remove" entry in step 904, then the entry is "file remove/directory create" entry. A warning is issued, the "file remove/directory create" entry is changed to a "Directory Update" type entry (step 908), and the process ends. The initial "file remove/directory create" entry is removed from processing during the processing of "create directories" entries.

If a directory does not exist along the relative path in step 902, then a determination is made as to whether a file exists along the path (step 910). If a file exists along the specified relative path, that file is removed (step 912) and the process ends. If a file does not exists along the specified path in step 910, an error has occurred and the process ends.

2) Remove Directories

Figure 9B:
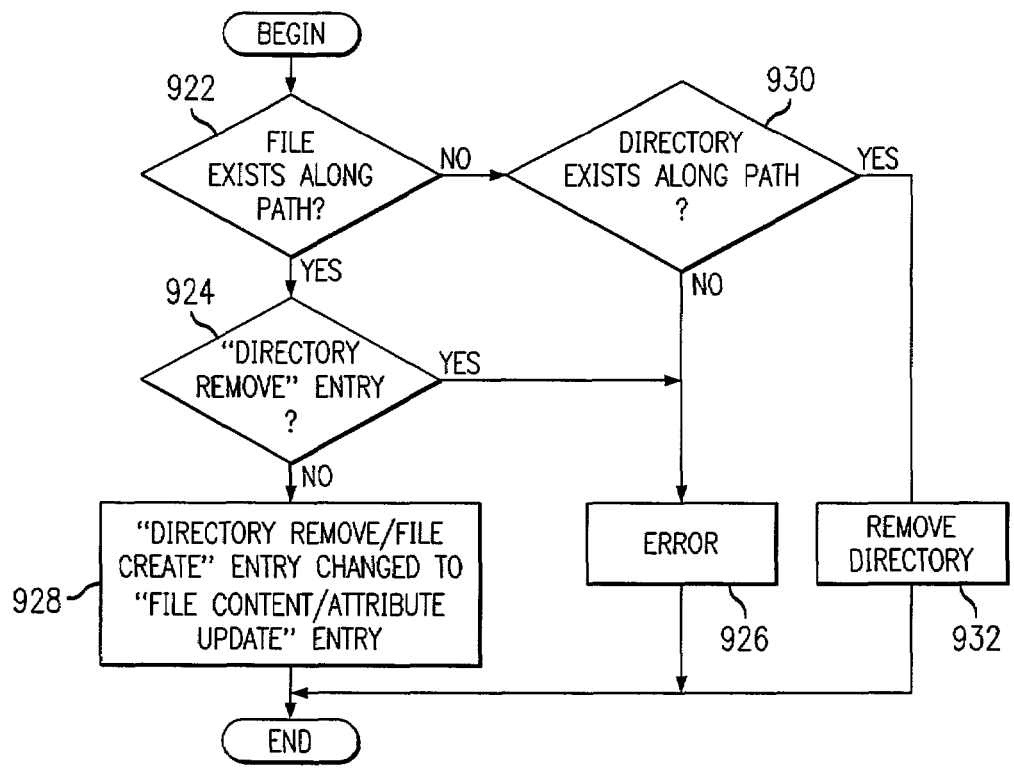

Directories are ordered according to their depth relative to the root of the target file system tree. For this step, directories are processed in order from the greatest to the lowest depth. FIG. 9B illustrates the operation of an extractor processing "directory remove" and "directory remove/file create" entries. The process begins and a determination is made as to whether a file exists along the specified relative path (step 922). If a file exists along the specified relative path, then a determination is made as to whether the entry is a "directory remove" s entry (step 924). If the entry is a "directory remover" entry, then an error has occurred (step 926) and processing ends.

If a directory exists along the specified relative path in step 922 and the entry is a "directory remove/file create" entry in step 924, then a warning is issued, the "directory remove/file create" entry is changed to a "file content/attribute update" entry (step 928), and the process ends. The "directory remove/file create" entry is removed from processing during the processing of "create files" entries.

If a file does not exists along the specified path in step 922, a determination is made as to whether a directory exists along the specified relative path (step 930). If no file or directory exists along the specified path then an error has occurred (step 926) and processing ends. If a directory exists along the specified path in step 930, then that directory is removed (step 932) and the process ends.

3) Create Directories

Figure 9C:
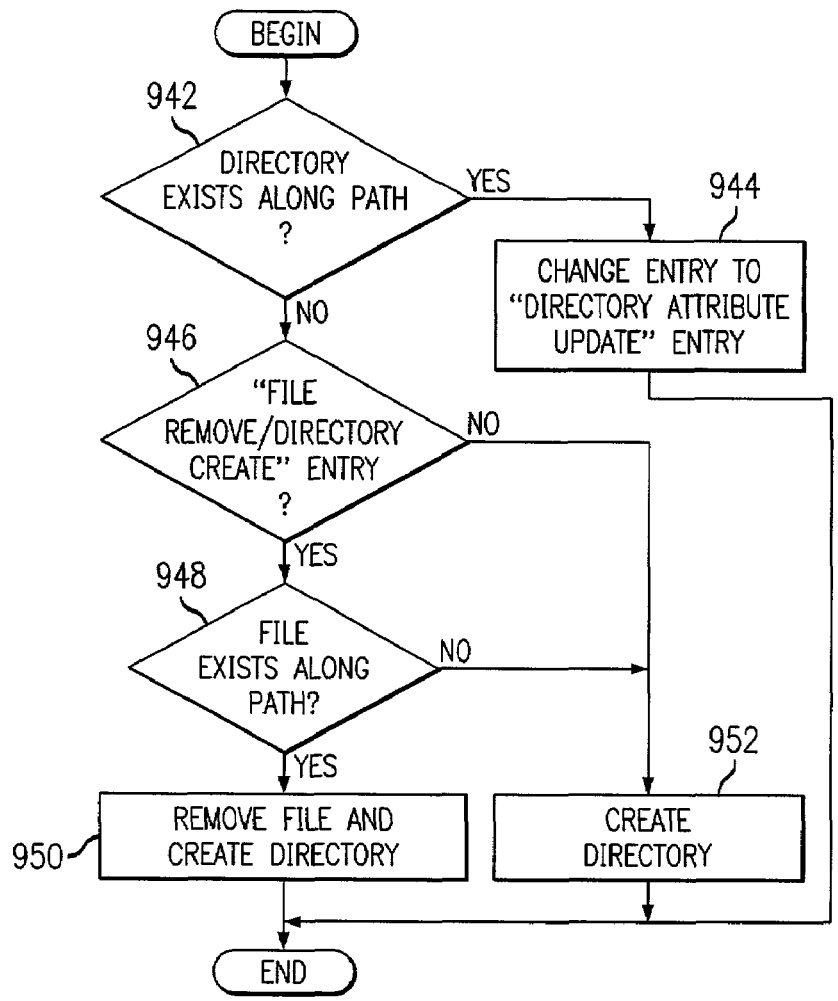

Directories are ordered according to their depth relative to the root of the target file system tree. For this step, directories are processed in order from the lowest to the greatest depth. FIG. 9C illustrates the operation of an extractor processing "directory create" and "file remove/directory create" entries. The process begins and a determination is made as to whether a directory exists along the specified relative path (step 942). If a directory exists along the relative path, a warning is issued, the entry is changed to a "directory attribute update" type entry (step 944), and the process ends.

If a directory does not exist along the specified path in step 942, a determination is made as to whether the entry is a "file remove/directory create" entry (step 946). If the entry is a "file remove/directory create" entry, a determination is made as to whether a file exists along the specified path (step 948). If a file exists along the specified path, then the file is removed and a directory is created with the name and attributes as specified in the entry (step 950). Thereafter, the process ends.

If a file does not exists along the specified path in step 948, the process creates a directory with the name and attributes as specified in the entry (step 952) and ends. Returning to step 946, if the entry is not a "file remove/directory create" entry, then the entry is a "directory create" entry and the process creates a directory with the name and attributes as specified in the entry (step 952) and ends.

4) Update Directory Attributes

Figure 9D:
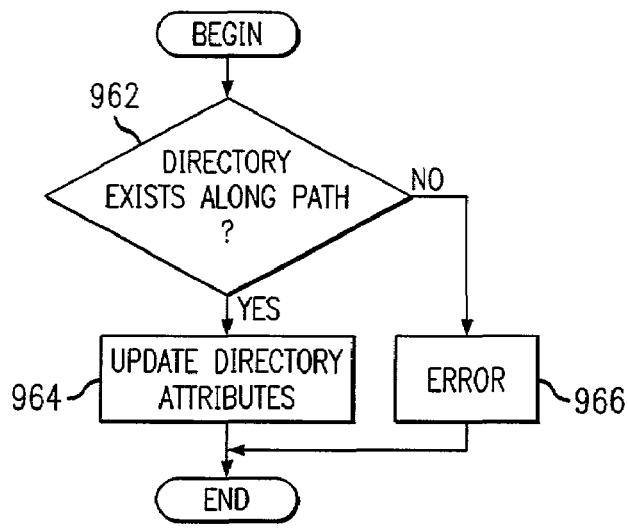

Directories are ordered according to their depth relative to the root of the target file system tree. For this step, directories are processed in order from the lowest to the greatest depth. FIG. 9D illustrates the operation of an extractor processing "directory attribute update" entries. The process begins and a determination is made as to whether a directory exists along the specified relative path (step 962). If a directory exists along the path, the process updates the directory attributes (step 964) and ends.

If a directory does not exists along the specified relative path in step 962, then an error has occurred (step 966) and processing ends.

5) Place File Contents

Figure 9E:
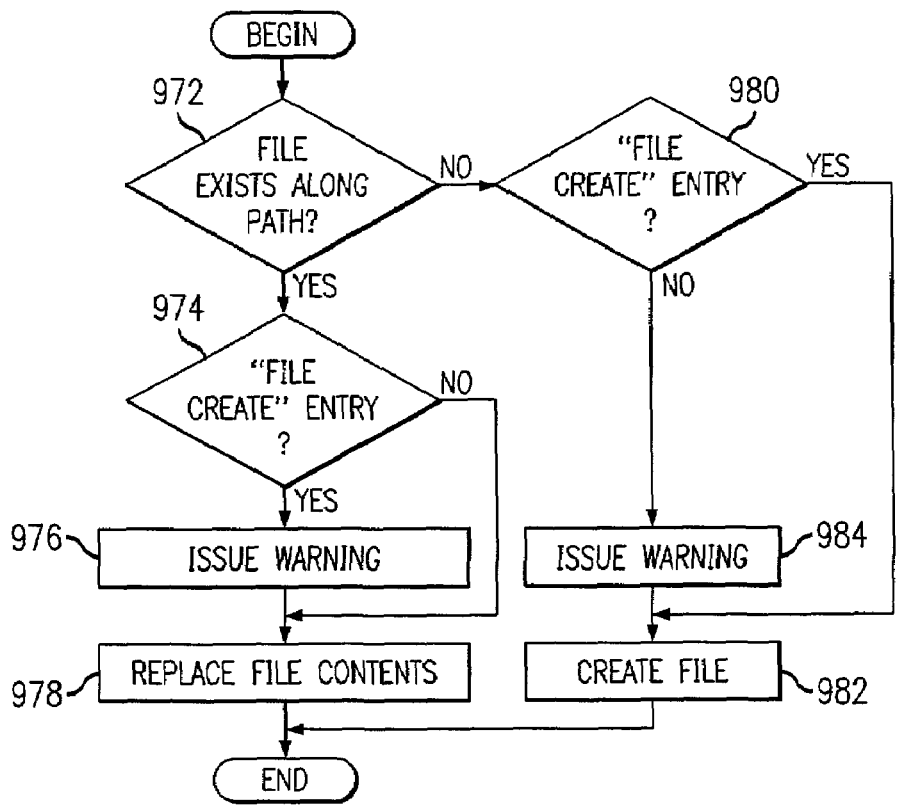

Files are ordered according to their depth relative to the root of the target file system tree. For this step, files are processed in order from the lowest to the greatest depth. FIG. 9E illustrates the operation of an extractor processing "file create," "directory remove/file create," "file content update," and "file content/attribute update" entries. The process begins and a determination is made as to whether a file exists along the specified relative path (step 972). If a file exists along the path, a determination is made as to whether the entry is a "file create" or "directory remove/file create" type entry (step 974). If the entry is a "file create" or "directory remove/file create" entry, then a warning is issued (step 976), the contents of the file are replaced with the specified contents (step 978), and the process ends.

If a file exists along the relative path and the entry is a "file content update" or "file content/attribute update" entry in step 974, then the contents of the file are replaced with the specified contents (step 978) and the process ends. If a file does not exist in step 972, a determination is made as to whether the entry is a "file create" or "directory remove/file create" type entry (step 980).

If the entry is a "file create" or "directory remove/file create" entry, then a file is created having the relative path, the contents, and the attributes as specified by the entry (step 982) and the process ends. If a file does not exist in step 972 and the entry is a "file content update" or "file content/attribute update" type entry in step 980, then a warning is issued (step 984), a file is created having the relative path and contents as specified by the entry (step 982), and the process ends. The entry is removed from processing during the "update file attributes" step.

6) Update File Attributes

Figure 9F:
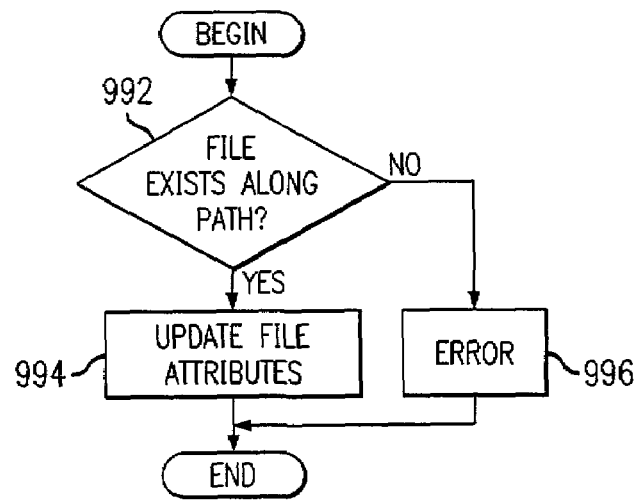

Files are ordered according to their depth relative to the root of the target file system tree. For this step, files are processed in order from the lowest to the greatest depth. FIG. 9F illustrates the operation of an extractor processing "file attribute update" and "file content/attribute update" entries. The process begins and a determination is made as to whether a file exists along the specified relative path (step 992). If a file exists along the path, the process updates the file attributes (step 994) and ends.

If a file does not exist along the specified relative path in step 992, then an error has occurred (step 996) and processing ends.

Thus the present invention solves the disadvantages of the prior art by providing a mechanism for extending a Java archive file to include additional information that describes the contents of the archive as update information. A program is provided for determining differences between an initial file system tree and a final file system tree and encoding those differences into entries in a Java archive file. An extractor class is included in the Java archive file and named as the main class. The Java archive file may be transported to a site that needs a file system update. The Java archive file may be executed in a Java runtime environment to update a target file system. The extractor class is executed to decode and effectuate the difference entries in the archive file.

The Java archive format is convenient and widely available. The extended Java archive file can store program information as well as package extractor code. Therefore, update information, as well as the information needed to effectuate the updates, are provided in a single file. The specialized Java archive file is stored in a compressed format. Furthermore, since the extractor is a Java object module, it executes in a Java runtime environment. Thus, the delta JAR file is platform independent.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing an update to a file system, comprising:
   determining at least one difference between an initial file system tree and a final file system tree;
   creating a delta Java archive file;
   placing at least one difference entry, describing a difference between the initial file system tree and the final file system tree, into the delta Java archive file;
   placing an extractor class into the delta Java archive;
   transporting the delta Java archive file to a destination computer;
   identifying a target file system tree at the destination computer;
   receiving, at the destination computer, a delta Java archive that includes the at least one difference entry and the extractor class; and
   executing the extractor class, wherein the extractor class applies difference information in the at least one difference entry to the target file system tree to form a final file system tree.

2. The method of claim 1, wherein the determining step comprises:
   computing a list of files and directories for the initial file system tree and the final file system tree;
   making a list of paths that are present in the list of files and directories for the initial file system tree and not present in the list of files and directories for the final file system tree; and
   making a list of paths that are present in the list of files and directories for the final file system tree and not present in the list of files and directories for the initial file system tree, and noting complete attribute information of a directory and contents of a file for each path in the list of paths that are present in the list of files and directories for the final file system tree and not present in the list of files and directories for the initial file system tree in the final file system tree.

3. The method of claim 2, further comprising:
   placing a main class specification into the delta Java archive file naming the extractor class as the main class.

4. The method of claim 1, wherein the at least one difference entry comprises at least one of a directory remove entry, a directory create entry, a directory attribute update entry, a file remove entry, a file create entry, a file attribute update entry, a file content update entry, a file content update entry, a file attribute update entry, a file create/directory remove entry, and a file remove/directory create entry.

5. The method of claim 2, wherein the determining step further comprises:
   making a list of paths that are present in the list of files and directories for the initial file system tree and the list of files and directories for the final file system tree;
   noting each path that is associated with a file in the initial file system tree and a directory in the final file system tree; and
   noting each path that is associated with a directory in the initial file system tree and a file in the final file system tree.

6. The method of claim 5, wherein the determining step further comprising:
   for each path that is associated with a directory in both trees, comparing attributes of a directory in the initial file system tree with attributes of a directory in the final file system tree to determine if any of the attributes are different;
   noting complete attribution information of the directory in the final file system tree if any of the attributes are different;
   for each path that is associated with a file in both trees, comparing attributes of a file in the initial file system tree with attributes of a file in the final file system tree to determine if any of the attributes are different;
   noting complete attribution information of the file in the final file system tree if any of the attributes are different;
   for each path that is associated with a file in both trees, comparing contents of a file in the initial file system tree with contents of a file in the final file system tree to determine if any of the contents are different; and
   noting contents of the file in the final file system tree if any of the contents are different.

7. The method of claim 1, wherein the extractor class applies the difference information by performing an update operation comprising at least one of removing a file, removing a directory, creating a directory, updating directory attributes, placing file contents, and updating file attributes.

8. An apparatus for providing an update to a file system, comprising:
   determination means for determining at least one difference between an initial file system tree and a final file system tree;
   creation means for creating a delta Java archive file; and
   entry means for placing at least one difference entry, describing a difference between the initial file system tree and the final file system tree, into the delta Java archive file;
   placing means for placing an extractor class into the delta Java archive;
   transportation means for transporting the delta Java archive file to a destination computer;
   identification means for identifying a target file system tree at the destination computer;
   receipt means for receiving, at the destination computer, a delta Java archive that includes at least one difference entry and an extractor class; and
   execution means for executing the extractor class, wherein the extractor class applies difference information in the at least one difference entry to the target file system tree to form a final file system tree.

9. The apparatus of claim 8, wherein the determining means comprises:
   computing means for computing a list of files and directories for the initial file system tree and the final file system tree;
   making means for making a list of paths that are present in the list of files and directories for the initial file system tree and not present in the list of files and directories for the final file system tree; and making means for making a list of paths that are present in the list of files and directories for the final file system tree and not present in the list of files and directories for the initial file system tree; and noting complete attribute information of a directory and contents of a file for each path in the list of paths that are present in the list of files and directories for the final file system tree and not present in the list of files and directories for the initial file system tree in the final file system tree.

10. The apparatus of claim 9, further comprising:
means for placing a main class specification into the delta Java archive file naming the extractor class as the main class.

11. The apparatus of claim 8, wherein the at least one difference entry comprises at least one of a directory remove entry, a directory create entry, a directory attribute update entry, a file remove entry, a file create entry, a file attribute update entry, a file content update entry, a file content update entry, a file attribute update entry, a file create/directory remove entry, and a file remove/directory create entry.

12. The apparatus of claim 9, wherein the determining means further comprising:
making means for making a list of paths that are present in the list of files and directories for the initial file system tree and the list of files and directories for the final file system tree;
noting means for noting each path that is associated with a file in the initial file system tree and a directory in the final file system tree; and
noting means for noting each path that is associated with a directory in the initial file system tree and a file in the final file system tree.

13. The apparatus of claim 12, further comprising:
for each path that is associated with a directory in both trees, comparing means for comparing attributes of a directory in the initial file system tree with attributes of a directory in the final file system tree to determine if any of the attributes are different;
noting means for noting complete attribution information of the directory in the final file system tree if any of the attributes are different;
for each path that is associated with a file in both trees, comparing means for comparing attributes of a file in the initial file system tree with attributes of a file in the final file system tree to determine if any of the attributes are different;
noting means for noting complete attribution information of the file in the final file system tree if any of the attributes are different;
for each path that is associated with a file in both trees, comparing means for comparing contents of a file in the initial file system tree with contents of a file in the final file system tree to determine if any of the contents are different; and
noting means for noting contents of the file in the final file system tree if any of the contents are different.

14. The apparatus of claim 8, wherein the extractor class applies the difference information by performing an update operation comprising at least one of removing a file, removing a directory, creating a directory, updating directory attributes, placing file contents, and updating file attributes.

15. A computer program product, in a computer storage readable medium, for providing an update to a file system, comprising:
instructions for determining at least one difference between an initial file system tree and a final file system tree;
instructions for creating a delta Java archive file;
instructions for placing at least one difference entry, describing a difference between the initial file system tree and the final file system tree, into the delta Java archive file;
instructions for placing an extractor class into the delta Java archive;
instructions for transporting the delta Java archive file to a destination computer;
instructions for identifying a target file system tree at the destination computer;
instructions for receiving, at the destination computer, a delta Java archive that includes the at least one difference entry and the extractor class; and
instructions for executing the extractor class, wherein the extractor class applies difference information in the at least one difference entry to the target file system tree to form a final file system tree.

* * * * *